US012409101B2

(12) United States Patent
Chen

(10) Patent No.: US 12,409,101 B2
(45) Date of Patent: Sep. 9, 2025

(54) INERTIAL PERCUSSION MASSAGER

(71) Applicant: SHENZHEN GLOBAL TRADE NETWORK TECHNOLOGY CO., LTD, Shenzhen (CN)

(72) Inventor: Junjun Chen, Shenzhen (CN)

(73) Assignee: SHENZHEN GLOBAL TRADE NETWORK TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 19/192,407

(22) Filed: Apr. 29, 2025

(65) Prior Publication Data

US 2025/0255774 A1 Aug. 14, 2025

Related U.S. Application Data

(63) Continuation-in-part of application No. PCT/CN2022/138956, filed on Dec. 14, 2022.

(51) Int. Cl.

*A61H 19/00* (2006.01)
*A61H 23/00* (2006.01)
*A61H 23/02* (2006.01)

(52) U.S. Cl.

CPC .......... *A61H 23/006* (2013.01); *A61H 23/02* (2013.01); *A61H 2201/1207* (2013.01);
(Continued)

(58) Field of Classification Search

CPC ...... A61H 23/00; A61H 23/006; A61H 23/06; A61H 23/02; A61H 23/0254; A61H 19/00;
(Continued)

(56) References Cited

U.S. PATENT DOCUMENTS 11,369,545 B1 * 6/2022 He .......................... A61H 7/005
11,491,078 B1 * 11/2022 He .......................... A61H 7/005
(Continued)

FOREIGN PATENT DOCUMENTS

CN 2580958 Y 10/2003
CN 102655836 A 9/2012
(Continued)

*Primary Examiner* — Victoria Murphy
*Assistant Examiner* — Savannah L Gabriel
(74) *Attorney, Agent, or Firm* — Ming Jiang; OPENPTO US LLC

(57) ABSTRACT

Disclosed is an inertial percussion massager, including a percussion body provided with a free end and a drive end, a drive assembly, a drive strategy assembly, and a percussive massage portion arranged at the free end and configured to act on a target massage area in an impact manner to produce a percussive massage effect. The drive end is connected to the drive assembly. The drive strategy assembly is configured to control a motion strategy of the drive assembly and drive the free end of the percussion body to move at a frequency f. The frequency f is not less than 10 Hz. An inertia-based impact mechanism enables generation of a peak impact force stronger than that from traditional non-inertial percussion or pure vibration massage and facilitates more effective energy transfer even under same driving power, by optimizing mass distribution of the percussion body and/or increasing motion velocity.

18 Claims, 11 Drawing Sheets

(52) U.S. Cl.
CPC ................ *A61H 2201/1664* (2013.01); *A61H 2201/169* (2013.01); *A61H 2201/50* (2013.01)

(58) Field of Classification Search
CPC ........ A61H 19/30; A61H 19/34; A61H 19/40; A61H 19/44; A61H 21/00; A61H 7/002; A61H 7/003; A61H 7/005; A61H 2201/1207; A61H 2201/1664; A61H 2201/1676; A61H 2201/1418; A61H 2205/087
See application file for complete search history.

(56) References Cited

U.S. PATENT DOCUMENTS

| | | | | |
|---|---|---|---|---|
| 11,633,327 | B1 * | 4/2023 | Wu | A61H 23/0263 601/70 |
| 2011/0319812 | A1 * | 12/2011 | Goldberg | A61M 5/422 604/22 |
| 2013/0123675 | A1 * | 5/2013 | Oki | A61H 23/0254 601/112 |
| 2018/0161236 | A1 * | 6/2018 | Bailey | A61H 19/44 |
| 2023/0172804 | A1 * | 6/2023 | Gasner | A61H 13/00 15/22.1 |

FOREIGN PATENT DOCUMENTS

| | | | |
|---|---|---|---|
| CN | 202426843 | U | 9/2012 |
| CN | 203169555 | U | 9/2013 |
| CN | 103635174 | A | 3/2014 |
| CN | 108743300 | A | 11/2018 |
| CN | 211095924 | U | 7/2020 |
| CN | 212090195 | U | 12/2020 |
| CN | 215875477 | U | 2/2022 |
| CN | 114344122 | A | 4/2022 |
| DE | 20 2019 103 252 | U1 | 8/2019 |
| JP | 2006110289 | A | 4/2006 |
| WO | 2021099327 | A1 | 5/2021 |

* cited by examiner

INERTIAL PERCUSSION MASSAGER

CROSS REFERENCE TO RELATED APPLICATIONS

This application is the continuation in part of international application No. PCT/CN20 22/138956, filed on Dec. 14, 2022, which claims priority to Chinese Patent Application No. 202211404960.5, filed on Nov. 10, 2022.

TECHNICAL FIELD

The present disclosure belongs to the field of massage products, relates to the technology for enhancing percussion intensities on target massage areas, and particularly relates to an inertial percussion massager.

BACKGROUND

As a common device for rehabilitation, physiotherapy and daily health care, a massager simulates manual massage through mechanical vibration, tapping, pressing and other means, which helps to relieve muscle fatigue, promote blood circulation, and alleviate chronic pain. With the fast pace of modern life, users have increasingly higher demands for stimulation efficacy of massagers, particularly for effective stimulation of deep muscle tissues.

Conventional percussion massagers are designed to achieve percussive massage effects by applying impact forces on human bodies. However, percussion bodies of such massagers lack sufficient kinetic energy, thereby making it difficult to penetrate deep muscle tissues due to inadequate impact forces, and resulting in weak percussion and limited stimulation to human bodies.

SUMMARY

In order to solve the above technical problems, the present disclosure provides an inertial percussion massager.

In order to achieve the above objectives, the present disclosure adopts the following technical solutions:

an inertial percussion massager, including:

a percussion body provided with a free end and a drive end;

a drive assembly;

a drive strategy assembly;

a percussive massage portion arranged at the free end and configured to act on a target massage area in an impact manner to produce a percussive massage effect;

the drive end is connected to the drive assembly;

the drive strategy assembly is configured to control a motion strategy of the drive assembly and drive the free end of the percussion body to move at a frequency f; and the frequency f is not less than 10 Hz.

Preferably, the percussive massage portion is of a block structure or a layered structure located at the free end; and an average density ρ2 of the percussive massage portion is greater than an average density ρ0 of the percussion body.

Preferably, the inertial percussion massager includes:

a support assembly;

the support assembly partially encloses the percussion body to form an adaptively matched chamber based on a motion trajectory M of the percussion body;

and the chamber includes:

a first opening; and where an opening face of the first opening intersects with the motion trajectory M of the percussion body.

Preferably, a general orientation P1 of the opening face of the first opening is substantially consistent with the motion trajectory M of the percussion body.

Preferably, the support assembly includes:

a second opening, arranged opposite to the first opening; and an opening face of the second opening intersects with the motion trajectory M of the percussion body.

Preferably, a general orientation P2 of an opening face of the second opening is substantially consistent with the motion trajectory M of the percussion body.

Preferably, the inertial percussion massager includes:

an energy-storing elastic portion;

the energy-storing elastic portion is arranged at any position of a transmission path from the free end of the percussion body to the drive assembly; and when the free end of the percussion body is obstructed by the opening face, elastic potential energy is accumulated during elastic deformation.

Preferably, a length L of the percussion body is not less than 2 cm; and the length Lis a maximum external dimension of the percussion body.

Preferably, the frequency f is 30-80 Hz.

Preferably, the frequency f is 40-60 Hz.

Preferably, a length L of the percussion body is 3-8 cm.

Preferably, an average density ρ1 of the free end of the percussion body is greater than an average density ρ0 of the percussion body.

Preferably, the support assembly includes:

a first support arm, located around a circumferential side of the percussion body.

Preferably, the support assembly includes:

a second support arm, arranged opposite to the first support arm; and the percussion body is located between the first support arm and the second support arm.

Preferably, the support assembly includes:

a third opening; and a general orientation P3 of an opening face of the third opening is consistent with an axial direction of the inertial percussion massager.

Preferably, a shape of the chamber includes but is not limited to any one or a combination of more of a circular shape, an elliptical shape, a rectangular shape, a water drop shape, a leaf shape, and a biomimetic profile formed by composite curves.

Preferably, a shape of the percussion body includes but is not limited to any one or a combination of a spherical shape, a cylindrical shape, an ellipsoidal shape, a polygonal prism shape, a wavy shape, a flattened elliptical shape, and a dumbbell shape.

Preferably, a shape of the inertial percussion massager is any one or a combination of more of a rod shape, a spherical shape, and a quasi-spherical shape.

Preferably, the inertial percussion massager includes:

a secondary massage arm;

the percussion body is connected to the secondary massage arm to massage an in-vitro target massage area; and the support assembly is connected to the secondary massage arm.

Preferably, a shape of the first support arm includes but is not limited to any one or a combination of more of a straight plate shape, an arc-shaped plate shape, a wavy plate shape, and a tapered cross-section plate shape; and a shape of the second support arm includes but is not limited to any one or a combination of more of a straight plate shape, an arc-shaped plate shape, a wavy plate shape, and a tapered cross-section plate shape.

The present disclosure provides an inertial percussion massager, and the present disclosure has the following beneficial effects:

The inertia-based impact mechanism enables generation of a peak impact force stronger than that from traditional non-inertial percussion or pure vibration massage and facilitates more effective energy transfer even under same driving power, by optimizing mass distribution of the percussion body and/or increasing motion velocity.

Figure 1:
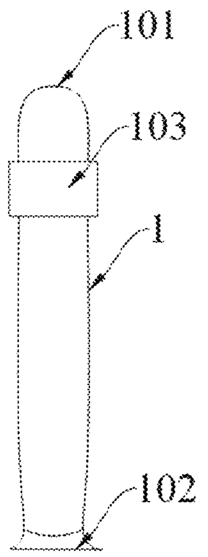
FIG. 1 is a schematic structural diagram of a percussion body of an inertial percussion massager provided by the present disclosure.

Reference numerals in the figures:

1—percussion body; 101—free end; 102—drive end; 103—percussive massage portion; 2—drive assembly; 201—motor; 202—transmission mechanism; 3—support assembly; 301—first support arm; 302—second support arm; 401—chamber; 402—first opening; 403—second opening; 404—third opening; and 5—secondary massage arm.

DETAILED DESCRIPTIONS OF THE EMBODIMENTS

The technical solutions in the examples of the present disclosure will be clearly and completely described below in combination with the accompanying drawings in the examples of the present disclosure. Apparently, the examples described are merely some rather than all of the examples of the present disclosure. Based on the examples of the present disclosure, all other examples obtained by those of ordinary skill in the art without making creative efforts shall fall within the protection scope of the present disclosure.

Figure 4:
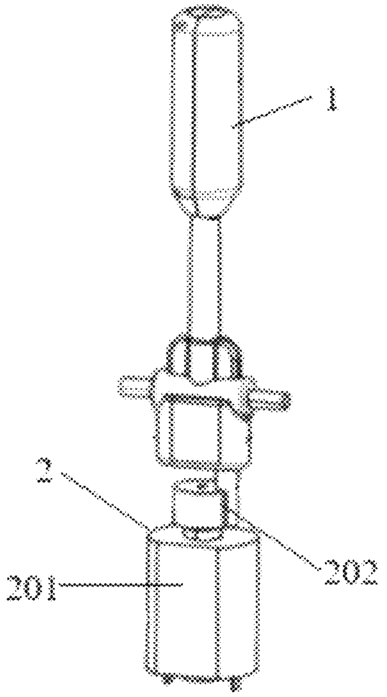
FIG. 4 is a schematic structural diagram I of a drive assembly of an inertial percussion massager provided by the present disclosure.

With reference to FIGS. 1-22, specific examples provided by the present disclosure are as follows:

With reference to FIGS. 1 and 4, an inertial percussion massager includes a drive assembly 2 and a percussion body 1.

The percussion body 1 is provided with a free end 101 and a drive end 102. It is to be understood that the free end 101 is one end portion of the percussion body 1, and the end portion is not connected and is in a relatively free state. It is to be understood that the drive end 102 is another end portion of the percussion body 1, and the end portion is configured for connection with the drive assembly 2 to receive a driving force from the drive assembly 2. The free end 101 exerts the driving force to perform percussive massage on a target massage area.

An average density ρ1 of the free end 101 of the percussion body 1 is greater than an average density ρ0 of the percussion body 1. For example, a counterweight with a density much higher than a density of the percussion body 1 is embedded inside the free end 101 of the percussion body 1. The counterweight may be a metal block such as steel or tungsten alloy, or high-density plastic, a ceramic block, or a polymer filled with metal powder. Consequently, mass is concentrated at the free end 101, thereby maximizing kinetic energy and momentum of the free end 101, and ultimately significantly enhancing an impact force and effect during percussive massage.

Specifically, the drive assembly 2 drives the percussion body 1 to perform a reciprocating swinging motion to form a percussive massage action.

In addition to percussive massage of the free end 101 on the target massage area, part of a main body of the percussion body 1, starting from the free end 101, also participates in the percussive massage, in a direction of pointing to the drive end 102. For example, part of the main body with a length of 1 cm, 2 cm, 3 cm, or the like, starting from the free end 101, always enables to perform the percussive massage on the target massage area.

In a specific embodiment, the drive assembly 2 is configured to drive the percussion body 1 to perform a reciprocating swinging motion. Specifically, the reciprocating swinging motion may be understood as periodic back-and-forth swinging of the percussion body 1 around a center or reference point that refers to a portion of the percussion body 1 close to the drive end 102 or a point of connection with the drive assembly 2. During the motion, the free end 101 of the percussion body 1 moves along a motion trajectory M. The motion trajectory M is an arc or a specific curve.

More specifically, when the percussion body 1 moves outward during a swinging stroke, the free end 101 and possibly a segment of the main body starting from the free end 101 move towards the target massage area with kinetic energy accumulated. When the percussion body swings to a specific position in the stroke or comes into contact with the target massage area, the free end 101 acts on the target massage area in an impact manner, and releases energy, which produces a percussive massage effect. Then the percussion body 1 swings back in an opposite direction, and after one motion cycle, next percussive impact is prepared.

It is to be understood that the drive assembly 2, under the control of a drive strategy assembly (not shown in the figure), ensures that the reciprocating swinging motion is executed at a specific frequency (e.g., not less than 10 Hz, or more preferably 30-80 Hz, with an appropriate amplitude), thereby ensuring continuity, stability, and effectiveness of percussive massage. An inertial impact generated by the reciprocating swing, combined with higher-density characteristics of the free end 101 of the percussion body 1, helps to achieve effective stimulation of deep tissues.

Figure 5:
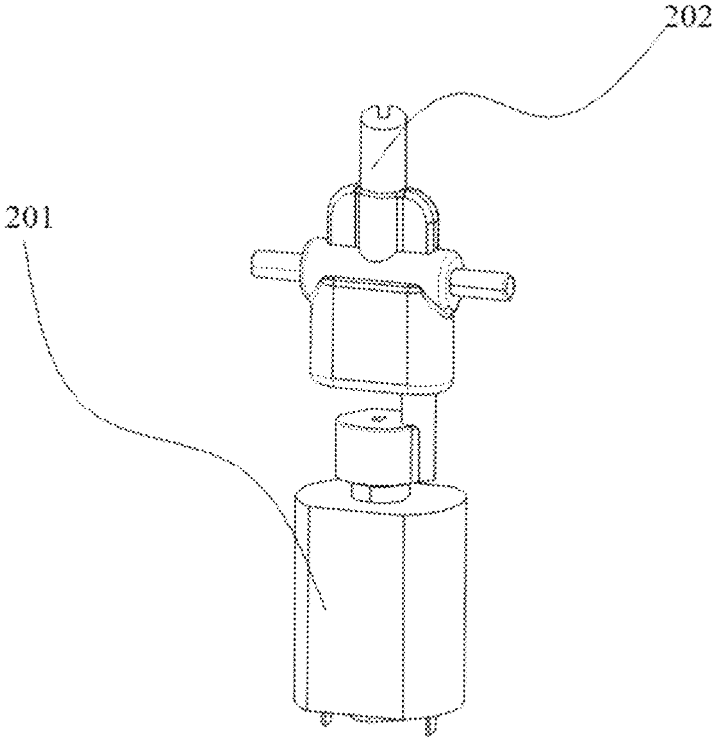
FIG. 5 is a schematic structural diagram II of a drive assembly of an inertial percussion massager provided by the present disclosure.
Figure 6:
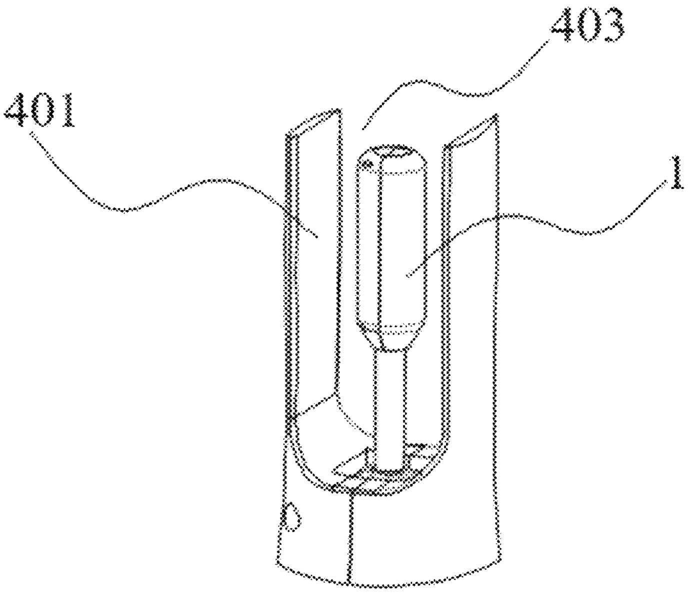
FIG. 6 is a schematic structural diagram of a percussion body and a chamber of an inertial percussion massager provided by the present disclosure.
Figure 7:
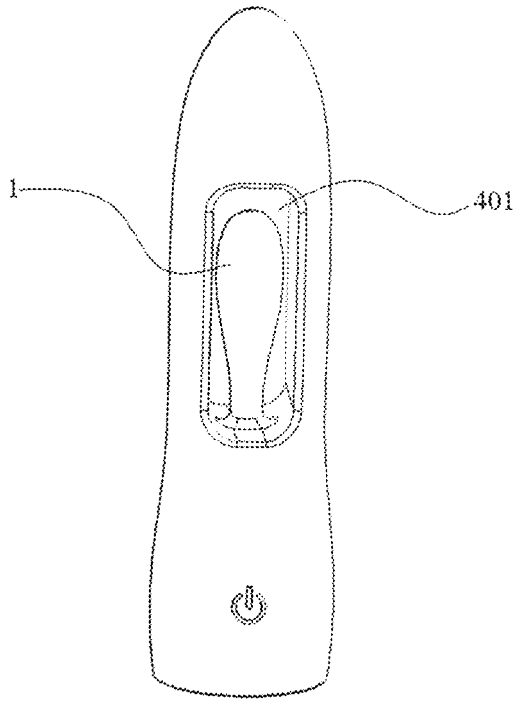
FIG. 7 is a perspective view of another embodiment of an inertial percussion massager provided by the present disclosure.

With reference to FIGS. 4 and 5, specifically, the drive assembly 2 may include a motor 201 (e.g., a DC motor or a brushless motor) and a transmission mechanism 202 (e.g., an eccentric wheel-link mechanism or a cam mechanism), and the transmission mechanism 202 converts a rotational motion of the motor 201 into a reciprocating swinging motion of the percussion body 1. Notably, implementation of the drive assembly 2 is not limited to the above, and any technical solution that enables the required reciprocating swinging motion of the percussion body 1 is applicable.

Specifically, according to a common and mature technical solution, the transmission mechanism 202 includes an eccentric wheel. The eccentric wheel is typically a disk-shaped or block-shaped component, and to achieve motion conversion through the eccentric wheel, a connecting rod is typically cooperatively used for the transmission mechanism 202. One end of the connecting rod is connected to an outer edge or a specific eccentric point of the eccentric wheel through a bearing, roller, or any other driven member structure, causing the end to precisely follow rotation of the eccentric wheel. The other end of the connecting rod is connected to a drive end of the percussion body 1 or a force-bearing point adjacent thereto through a pin shaft, a spherical hinge, or any other connection method.

When the motor 201 is activated and drives the eccentric wheel to rotate at a specific rotational speed, the end of the connecting rod that follows the eccentric wheel performs a circular motion due to eccentric configuration. The circular motion transmitted through the rigid connecting rod forces the end connected to the percussion body 1 to perform an approximately linear or slightly curved reciprocating motion. The percussion body 1 typically swings around a certain area close to the drive assembly that can be viewed as a fulcrum or pivot, and therefore a reciprocating driving force transmitted through the connecting rod ultimately causes the free end of the percussion body 1 (e.g., the end where percussive massage on the target massage area occurs) to perform sustained and stable reciprocating swinging motions. The swinging motion causes a percussive massage portion to move back and forth along a specific motion trajectory M, so as to achieve periodic impact percussion on the target massage area.

It is to be understood that an impact from the percussion body 1 is inertial-driven. Specifically, the "inertial-driven" refers to that the percussion body 1 does not rely solely on an instantaneous acting force exerted by the drive assembly 2 to complete a percussive action, but accumulates kinetic energy by virtue of its intrinsic mass and motion velocity when driven to perform the reciprocating swinging motion. When the free end 101 of the percussion body 1 comes into contact with the target massage area, accumulated kinetic energy, due to inertia defined as a tendency of an object to maintain its state of motion, is converted into an impact force applied to the target massage area.

In other words, a magnitude of the impact force is not only related to an instantaneous output of the drive assembly 2 but is more significantly correlated with a momentum of the percussion body 1 at a moment of contact. The inertia-based impact mechanism enables generation of a peak impact force stronger than that from traditional non-inertial percussion or pure vibration massage and facilitates more effective energy transfer even under same driving power, by optimizing mass distribution of the percussion body 1 and/or increasing motion velocity.

Therefore, an inertial-driven impact from the percussion body 1 is one of the key technical ideas that differentiates the present disclosure from the prior art, with an aim to enhance the impact force and achieve effective massage on deep tissues. It is ensured that the percussive action is not merely superficial "tapping", but an impact process of effectively transmitting energy into a target area in a concentrated manner, thereby better meeting users' needs for alleviating deep muscle fatigue and pain.

For example, the inertial-driven impact may be different from a simple elastic collision in action time or pressure curves, and is potentially characterized by a shorter duration and higher peak values, or a transient sustained pressure is generated after contact, which helps to penetrate superficial soft tissues and directly reach deep muscle groups or fascia.

In a specific embodiment, a length L of the percussion body 1 is not less than 2 cm; and the length Lis a maximum external dimension of the percussion body 1.

Preferably, the length is 3 cm, 4 cm, 5 cm, 6 cm, 7 cm, 8 cm, 9 cm, 10 cm, 11 cm, 12 cm, 13 cm, 14 cm, or 15 cm.

In a specific embodiment, geometrical morphology of the percussion body 1 as a core moving component for achieving an inertial percussive massage function directly influences massage experience and effects. To meet diverse massage needs and optimize massage effects on specific areas, the percussion body 1 of the present disclosure is designed to have high flexibility. A shape of the percussion body 1 includes but is not limited to any one or a combination of various shapes listed below:

A spherical shape, which enables point-like or small-area contact with relatively concentrated pressure distribution, and is suitable for deep stimulation of specific pain points or acupoints.

A flattened elliptical shape, which provides a larger-area contact face with relatively uniform pressure distribution, and is suitable for relaxing percussion on large muscle groups, with a typically gentle sense of touch.

A cylindrical shape, which enables wirelike to or slightly curved contact, and features a percussion area and pressure being spherical and flattened elliptical, as well as good versatility.

An ellipsoidal shape, which is similar to the spherical shape but is directional, and provides contact faces of different sizes and pressures according to major and minor axis directions.

A polygonal prism shape, such as a triangular prism shape, a quadrangular prism shape, or a hexagonal prism shape, edges of which create stronger scraping or cutting sensations during percussion, which is suitable for fascia release or stimulation of specific tissues.

A wavy shape, where a surface of the percussion body 1 exhibits continuous wavy undulations, and a kneading and rubbing effect or a rolling effect is formed during percussion, thereby enhancing compound sensation of massage.

A dumbbell shape, with heavier or larger ends and a relatively smaller middle part. Mass distribution of the percussion body 1 may be optimized to enhance an inertial impact effect at the ends.

It is to be particularly pointed out that the shapes listed above are merely exemplary and are not intended to exhaustively list all possible shapes of the percussion body 1. The protection scope of the present disclosure encompasses any shape of the percussion body 1 that enables to achieve the purpose of inertial percussive massage.

In a specific embodiment, the inertial percussion massager of the present disclosure further includes a drive strategy assembly (not shown in the figure).

It is to be understood that the drive strategy assembly is a "brain" or control core of the entire massager. The drive strategy assembly is configured mainly to formulate and execute a detailed motion strategy according to a preset program, a user input, or potential sensor feedback, so as to control a specific operating mode of the drive assembly 2.

The motion strategy mainly aims to ensure that the drive assembly 2 drives the free end 101 of the percussion body 1 to move at a specific target frequency f. The frequency f is typically within a range in which an inertial percussion effect is formed (e.g., not less than 10 Hz, preferably 30-80 Hz, or even 40-60 Hz), and the drive strategy assembly maintains frequency stability or adjusts the frequency as needed.

However, the motion strategy usually is not limited to frequency control. Specifically, the drive strategy assembly further has a control function as follows:

A swinging amplitude or impact force of the free end 101 of the percussion body 1 is adjusted by regulating output power of the drive assembly 2 or changing a stroke thereof to accommodate different user tolerances or meet massage needs for various target massage areas.

Various massage programs and modes may be preset, including a constant frequency-intensity mode, a pulsed percussion mode, a frequency/intensity gradient modulation mode, or the like. The drive strategy assembly executes these complex massage modes.

Typically, the drive strategy assembly is connected to a user interface, such as a button, a display screen, or a touch controller, receives a user command about power on/off, mode selection, or intensity adjustment, and adjusts the motion strategy accordingly.

For example, the drive strategy assembly has safety functions of soft start and overload protection, such as power reducing or halt when current abnormity of the motor 201 is detected, and timed shutdown.

To effectively control the drive assembly 2, the drive strategy assembly, typically based on a microcontroller unit (MCU) or an electronic unit of an application-specific integrated circuit (ASIC), generates corresponding electrical signals (e.g., pulse width modulation (PWM) signals, analog voltage signals, or digital instructions), and transmits them to an actuating element of the drive assembly 2 such as a driver for the motor 201, thereby achieving precise control over energy delivery and motion states.

With reference to FIG. 1, in a specific embodiment, a percussive massage portion 103 is included and arranged at the free end 101 of the percussion body 1, or within a segment extending from the free end 101 by no more than a predetermined range of a total length of the percussion body 1. The predetermined range is from 10% to 50%.

The percussive massage portion 103 is integrally formed with the percussion body 1, or the percussive massage portion 103 and the percussion body 1 are two separate components, where the percussive massage portion 103 is sleeved on or embedded in the percussion body 1.

The percussive massage portion 103 is in direct contact with the target massage area. As the percussion body 1 swings, the percussive massage portion 103 synchronously moves. As the percussion body 1, together with the percussive massage portion 103, swings from one side to contact the target massage area, kinetic energy is accumulated in the motion process, and the two components possess inertia due to intrinsic mass.

The inertia mentioned herein refers to the property of an object to maintain its original state of motion, including velocity and direction. When the percussive massage portion 103 is about to contact or just contacts the target massage area, the entire percussion body 1, due to inertia, retains a forward motion tendency. Therefore, inertia causes the percussive massage portion 103 to transfer accumulated kinetic energy to the target massage area in the form of a transient and concentrated force at a moment of contact, which is referred to as "impact-style percussion". Greater mass and faster swinging velocity of the percussion body 1 and the percussive massage portion 103 indicate stronger inertia, more kinetic energy, and a usually larger impact force at the moment of contact.

The percussive massage portion 103 may be of a block structure or a layered structure. It is to be understood that the block structure includes a plurality of protruding blocks arranged on an axial wall face of the percussion body 1.

Specifically, the percussive massage portion 103 may include a plurality of protruding blocks distributed along a circumferential wall face of the free end 101 of the percussion body 1. These protruding blocks may be arranged uniformly or arranged in a specific staggered or spiral manner, to meet different massage needs.

Specifically, the percussion body 1 is made of a medium-density silicone material, such as general-purpose solid silicone rubber with a Shore A hardness of 30-60, and the percussive massage portion 103 is made of a high-density silicone material, such as high-hardness solid silicone rubber with a Shore A hardness of 65-80. Alternatively, the percussive massage portion 103 is made of plastic.

The materials mentioned above are merely exemplary and are not intended to limit the scope of protection.

The protruding blocks may be cylindrical, hemispherical, or pyramidal, and dimensions such as diameter and height are adjustable according to massage requirements for the target massage area. For example, a diameter of a cylindrical protruding block may range from 5 mm to 15 mm, and a height thereof may range from 3 mm to 10 mm.

The percussive massage portion 103 is alternatively of a layered structure. Specifically, the layered structure refers to a structure in which the free end 101 of the percussion body 1 is coated with one or more layers of material, to optimize impact force transmission and enhance user comfort.

The free end 101 may be coated with a layer of an elastic material such as silicone or rubber, with a thickness ranging from 2 mm to 8 mm. The elastic material may minimize direct rigid contact with skin and enhance massage comfort while maintaining an impact force.

The layered structure is alternatively a combination of multilayer materials. For example, a high-density material (e.g., rigid plastic or a metal sheet) is used for an inner layer to enhance an inertial effect, and an outer layer is coated with a soft material (e.g., sponge or soft silicone) to protect skin and cushion an impact force. A total thickness of a multilayer structure may be controlled within a range of 5 mm to 15 mm, and a thickness and hardness of each layer of material may be adjusted based on actual needs.

Overall, an average density ρ2 of the percussive massage portion 103 is greater than the average density ρ0 of the percussion body 1.

Specifically, the percussive massage portion 103 may be made of a high-density material, and in contrast, the main body of the percussion body 1, excluding the percussive massage portion 103, may be made of a lower-density material. Differences in the materials directly result in that the average density ρ2 of the percussive massage portion 103 is greater than the overall average density ρ0 of the percussion body 1.

Specifically, density advantages of the percussive massage portion 103 may be further achieved through structural reinforcement. For example, in the block structure, the protruding blocks may be of a solid or high-fill structure, and other parts of the percussion body 1 may be of a hollow or low-fill structure, to further widen a density gap. Structural differences not only improve ρ2 but also optimize the mass distribution of the percussion body 1.

In summary, the higher density ρ2 of the percussive massage portion 103 located at the free end 101 is intended to maximize kinetic energy generated during swinging. According to a momentum formula (momentum=mass×velocity), the percussive massage portion 103 with a larger mass generates a greater momentum at a same swinging velocity. Compared to the percussion body 1 of density uniformity, a peak impact force of the high-density percussive massage portion 103 may increase by about 15%-25%, to more effectively act on deep tissues.

Further, the high-density percussive massage portion 103 reduces energy dissipation during the impact process. A lower-density main body of the percussion body 1 tends to absorb or disperse some kinetic energy, and the high-density percussive massage portion 103 transfers kinetic energy to the target massage area in a more concentrated manner. The characteristic allows the massager to achieve efficient massage even at lower driving power, which is suitable for prolonged use or energy-saving design.

Figure 2:
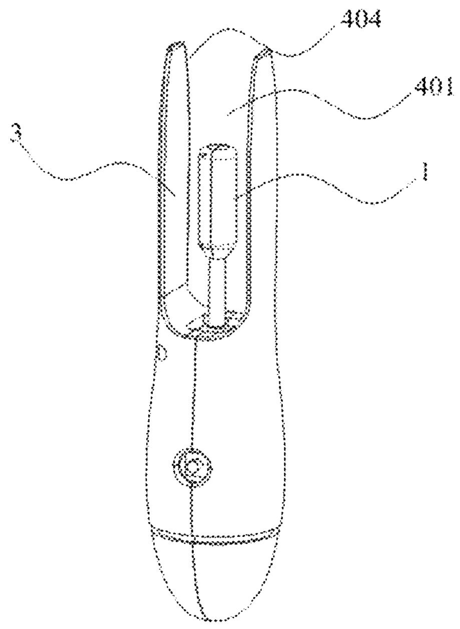
FIG. 2 is a perspective view of an embodiment of an inertial percussion massager provided by the present disclosure.
Figure 3:
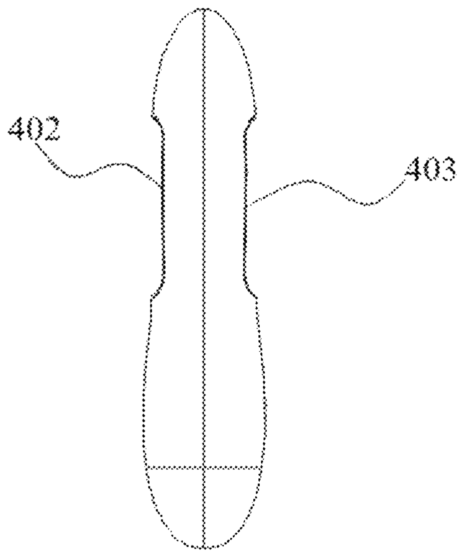
FIG. 3 is a side view of a structure shown FIG. 2.

With reference to FIGS. 2 and 3, in a specific embodiment, the inertial percussion massager further includes a support assembly 3.

An important function of the support assembly 3 is to partially enclose the percussion body 1. Specifically, the enclosure is not complete sealing, but means that an adaptively matched chamber 401 is formed around the percussion body 1. The term "adaptively matched" means that an internal space contour of the chamber 401 is designed to match a shape and an intended motion trajectory M of the percussion body 1. It means that the chamber 401 usually provides necessary and slightly ample space for motion of the percussion body 1 within a stroke range, which avoids unnecessary interference or friction and prevents tissues in the target massage area from obstructing the percussion body 1, thereby ensuring smooth percussive massage by the percussion body 1.

Figure 10:
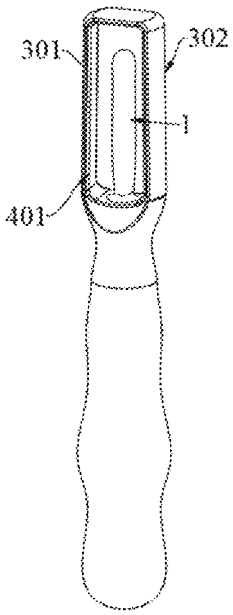
FIG. 10 is a perspective view of yet another embodiment of an inertial percussion massager provided by the present disclosure.

With reference to FIG. 10, the chamber 401 is provided with at least one first opening 402. The first opening 402 is a critical passage for interaction between the percussion body 1 and an external target massage area. An opening face of the first opening 402 is arranged to intersect with the motion trajectory M of the percussion body 1, and a general orientation P1 of the opening face of the first opening 402 is substantially consistent with the motion trajectory M of the percussion body 1. Only when the opening face intersects with the motion trajectory, the free end 101 of the percussion body 1 or the percussive massage portion 103 that moves along the motion trajectory smoothly and effectively extends from inside of the chamber 401 during motion, thereby achieving contact with and impact-style percussive massage on a body surface or specific area. When the opening face does not intersect with the motion trajectory or is completely parallel thereto, the percussion body 1 maybe fails to extend or function in an intended direction.

Therefore, the adaptively matched chamber 401 with a specific opening formed by the support assembly 3 not only provides structural guidance and support for precise and stable motion of the percussion body 1, but also defines a working area of a percussive massage head effectively acting on an external area.

With reference to FIGS. 7-20, in some embodiments, the shape of the chamber 401 includes but is not limited to any one or a combination of more of a circular shape, an elliptical shape, a rectangular shape, a water drop shape, a leaf shape, and a biomimetic profile formed by composite curves, to adapt to the reciprocating linear or swinging motion of the percussion body 1. Accordingly, the shape of the first opening 402 maybe matches the shape of a cross-section of the chamber 401 or the shape of the free end 101 of the percussion body 1, and for example, a circular or elliptical opening may be adopted. Edges of the opening may be chamfered or rounded to reduce wear when the percussion body 1 extends and retracts and enhance safety of contact with the user.

Figure 11:
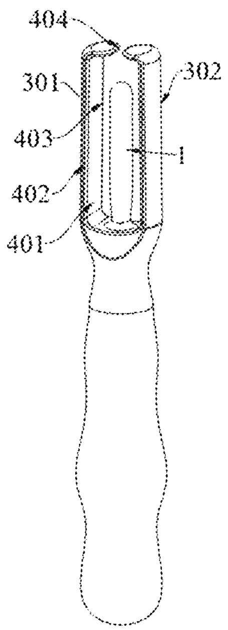
FIG. 11 is a perspective view of yet another embodiment of an inertial percussion massager provided by the present disclosure.
Figure 12:
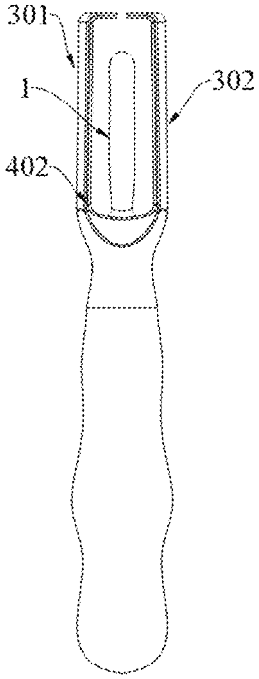
FIG. 12 is a perspective view of yet another embodiment of an inertial percussion massager provided by the present disclosure.
Figure 13:
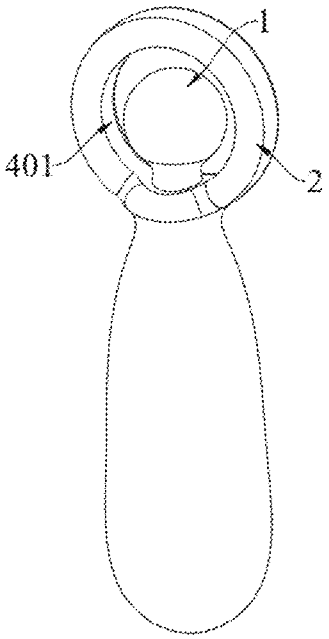
FIG. 13 is a perspective view of yet another embodiment of an inertial percussion massager provided by the present disclosure.
Figure 14:
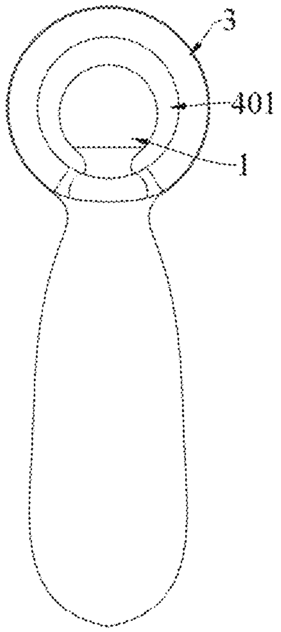
FIG. 14 is a front view of a structure shown in FIG. 13.
Figure 15:
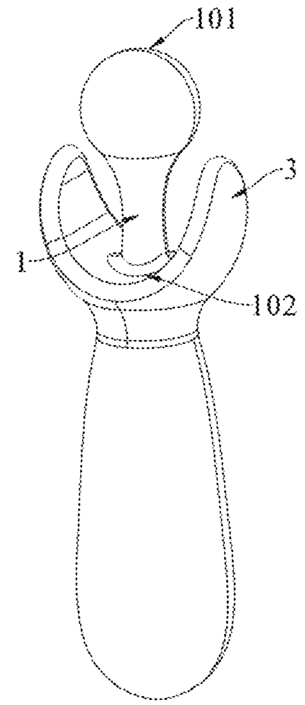
FIG. 15 is a perspective view of yet another embodiment of an inertial percussion massager provided by the present disclosure.
Figure 16:
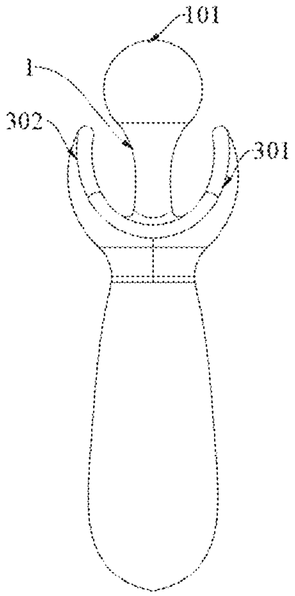
FIG. 16 is a front view of a structure shown in FIG. 15.
Figure 17:
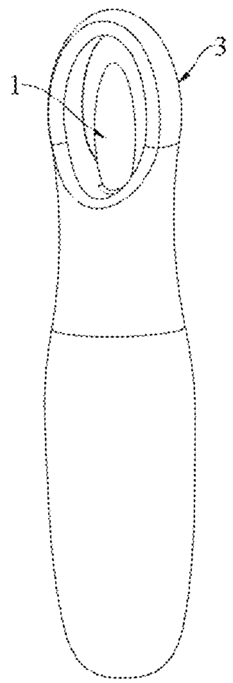
FIG. 17 is a perspective view of yet another embodiment of an inertial percussion massager provided by the present disclosure.
Figure 18:
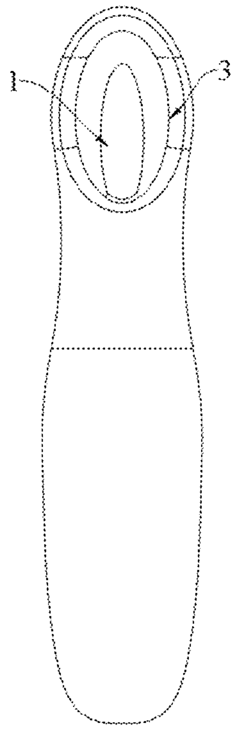
FIG. 18 is a front view of a structure shown in FIG. 17.

With reference to FIG. 11, in some embodiments, the support assembly 3 may further include a second opening 403. A general orientation P2 of an opening face of the second opening 403 is substantially consistent with the motion trajectory M of the percussion body 1.

One significant feature lies in that the second opening 403 is typically arranged opposite to the first opening 402. For example, when the first opening 402 is located at one end of the chamber 401, the second opening 403 may be located at the opposite other end of the chamber 401; or when the first opening 402 is located on a side face of the chamber 401, the second opening 403 is located on an opposite side face thereof.

In correspondence with the critical feature of the first opening 402, the opening face of the second opening 403 also intersects with the motion trajectory M of the percussion body 1.

Specifically, when the percussion body 1 reaches a limit position away from the first opening 402 during a reciprocating motion, the percussion body enters or crosses a space defined by the second opening 403, thereby enabling the percussive massage on both sides of the target massage area.

In a specific embodiment, the inertial percussion massager further includes an energy-storing elastic portion (not shown in the figure).

A notable feature of the energy-storing elastic portion lies in layout flexibility. The energy-storing elastic portion may be arranged at any position of an entire energy and force transmission path between the free end 101 of the percussion body 1 and the drive assembly 2. The path broadly encompasses part of the percussion body 1 close to the free end 101, the main body thereof, the drive end 102, any connecting rod, gear or other transmission element connected to the drive end 102, and any component in front of an output end of the drive assembly 2.

A core working mechanism of the energy-storing elastic portion is reflected in response to "obstruction". Specifically, when the free end 101 of the percussion body 1 encounters an external resistance sufficient to impede its normal full-stroke motion along a motion path or particularly at a position where the free end 101 is intended to extend from the first opening 402 of the support assembly 3, or when the free end 101 has contacted and pressed against the target massage area (e.g., when the user presses hard the massage head against his/her body, or when the massage head is impacted by hard tissues or bones), the energy-storing elastic portion comes into play. In this case, since a force along the transmission path is still being transmitted and movement of the free end 101 is restricted, the energy-storing elastic portion undergoes recoverable elastic deformation, such as being compressed, stretched, bent, or twisted.

Along with the elastic deformation, a key physical process occurs synchronously: part of the energy originally intended to drive the percussion body 1 to further move forward, or some kinetic energy carried by the percussion body 1 before being obstructed, is absorbed by the energy-storing elastic portion and stored as elastic potential energy.

On this basis, primarily, the energy-storing elastic portion effectively absorbs impact energy generated by sudden obstruction or end-stroke collision, thereby protecting the drive assembly 2 from overload impacts and extending a service life of the massager. Additionally, a rigid impact transmitted to the user's hands or body is also reduced.

Moreover, the energy-storing elastic portion causes the massage head to have a certain degree of "flexibility" when pressed against the user's body, which enables to better conform to body contours and avoids an overly rigid and uncomfortable sense of collision with a bony structure or a sensitive area.

Further, at some high reciprocating frequencies, the energy-storing elastic portion helps the massage head to maintain contact pressure against a massage surface for some time when being pressed, without risk of rigidly rebounding.

The energy-storing elastic portion may be physically implemented in various forms, and for example, the energy-storing elastic portion may be a cushion pad, a sleeve, or a profiled element made from high-performance elastomers such as rubber or polyurethane, or a transmission connecting rod or a segment of the percussion body 1 is specially designed to have a structure of elastic deformation.

Figure 8:
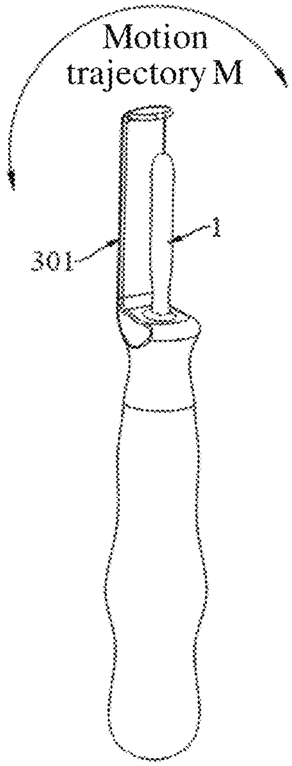
FIG. 8 is a perspective view of yet another embodiment of an inertial percussion massager provided by the present disclosure.
Figure 9:
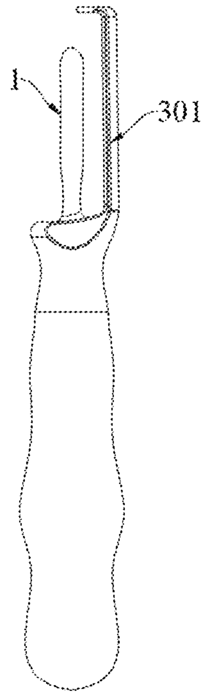
FIG. 9 is a front view of a structure shown in FIG. 8.

With reference to FIGS. 8 and 9, in a specific embodiment, the support assembly 3 may include at least one structural element, i.e., a first support arm 301.

The first support arm 301 is arranged around a circumferential side of the percussion body 1. It is to be understood that the term "circumferential side" means that the support arm is arranged adjacent to the main body of the percussion body 1. In other words, the first support arm 301 is located beside a motion path of the percussion body 1, which defines a boundary for a motion space of the percussion body 1.

Functionally, the first support arm 301 may be viewed as one of key structures for a side wall of the above adaptively matched chamber 401. When the percussion body 1 performs the reciprocating swinging motion along the motion trajectory M, the first support arm 301 helps to prevent tissues in the target massage area from obstructing the percussion body 1.

Additionally, the first support arm 301 is also an important structural support component for the support assembly 3 and even a head portion of the entire massager. The first support arm 301 helps to enhance overall rigidity and strength of the support assembly 3 and ensure minimal deformation under the action of a percussive reaction force or an external pressing force, thereby guaranteeing durability and reliability of the massager.

The first support arm 301 may vary in shape, and for example, the first support arm may be simply shaped like a straight plate, or be shaped like an arc-shaped plate fitted with a contour of the percussion body 1 or the chamber 401, or have a special cross-section, such as a tapered cross-section or a wavy cross-section, to achieve specific guiding effects or strength requirements. The first support arm 301 is usually made of engineering plastics with sufficient strength and wear resistance.

With reference to FIGS. 11-12 and FIGS. 15-16, in a specific embodiment, the support assembly 3 further includes a second support arm 302 in addition to the above first support arm 301.

A key structural feature of the second support arm 302 lies in arrangement opposite to the first support arm 301. The term "arrangement opposite" means that taking the motion trajectory of the percussion body 1 or a central position thereof inside the chamber 401 as a reference point, the first support arm 301 and the second support arm 302 are located on opposite sides. For example, when the first support arm 301 is located on one side of the percussion body 1, the second support arm 302 is located on the opposite other side, and the two support arms together define a motion range of the percussion body 1 in the direction.

Based on the arrangement opposite to each other, the percussion body 1 is effectively positioned and confined between the first support arm 301 and the second support arm 302 during motion thereof. In other words, the two support arms opposite to each other collaboratively form a more complete and definitive lateral boundary of the adaptively matched chamber 401.

Compared to a single-side support arm only, the two arms arranged opposite to each other provide more comprehensive and symmetrical obstruction to lateral or sideways displacement of the percussion body 1 along the motion trajectory M. The first support arm 301 and the second support arm 302 collectively enclose and clearly define a boundary of the chamber 401 in which the percussion body 1 moves, which helps to prevent soft tissues in an external target massage area from inadvertently intruding into the chamber 401 and interfering with normal motion of the percussion body 1, thereby ensuring smooth percussive actions.

In specific implementation, the second support arm 302 typically resembles the first support arm 301 in shape, material, and size, or the two support arms are symmetrically designed, to form the regular and matched chamber 401. For example, both the two support arms may be shaped like a straight plate or an arc-shaped plate or have a platy structure specifically contoured, and are made of engineering plastics with sufficient strength and wear resistance.

In a specific embodiment, the support assembly 3 is provided with a third opening 404. The third opening 404 is arranged in an area of the support assembly 3 axially above the percussion body 1. The term "axially above" refers to a top position in a primary length direction of the massager or the percussion body 1 that is away from the drive end 102 and closer to or beyond a normal motion range of the free end 101. A core function is to allow the percussion body 1 or a distal end portion thereof to extend (partially) from the third opening 404 (in an axis direction) to the chamber 401 formed by the support assembly 3 under specific conditions, e.g., when reaching a certain limit point of a primary reciprocating or swinging stroke.

A general orientation P3 of an opening face of the third opening 404 is consistent with an axial direction of the inertial percussion massager. It is to be understood that the "axial direction of the inertial percussion massager" is defined as a primary extension direction of the massager, such as a handle direction or a length direction of the main body, and a plane where the third opening 404 is located is roughly perpendicular to a principal axis of the massager. Therefore, the percussion body 1, during motion, may extend from the third opening 404 and come into contact with the target massage area.

When the percussion body 1 extends from the opening, the distal end thereof cooperates with other parts of a housing of the massager or specific accessories, to achieve localized pressing, scraping, or any other specialized massage distinct from conventional percussion.

The third opening 404 may be circular, elliptical or racetrack-shaped, and a size thereof is designed based on protruding portions of the percussion body 1 and desired functions.

An overall shape of the inertial percussion massager may also be diversified based on different usage scenarios. This design enables the massager to be better used in daily life of the user, and enables the user to enjoy a convenient and comfortable use experience. In a specific embodiment, the inertial percussion massager is a complete product housing all components including the percussion body 1, the drive assembly 2, and a control system, and a shape of the main body thereof is any one or a combination of more of a rod shape, a spherical shape, and a quasi-spherical shape.

Specifically, the main body of the rod shape as a common shape of the massager is particularly suitable for handheld operation.

By holding a handle portion of the rod-shaped main body, the user easily aligns and inserts a front end of the massager (including the percussion body 1 and the optional support assembly 3) into a target massage area for invasive massage.

A length and thickness of the rod-shaped main body, and a shape and weight distribution of the handle may be optimized to ensure good grip comfort, directional control, and low fatigue during prolonged use. An internal percussion mechanism operates in a direction along or perpendicular to an axis of the rod-shaped main body.

When the massager is provided with a spherical main body, the spherical main body may be inserted into or placed inside a cavity-type target massage area for invasive massage.

The quasi-spherical shape refers to that an overall contour of the main body is nearly spherical, but non-spherical features may be designed. For example, the main body may be elliptical, or be provided with a plane structure for stable placement and sinking, which facilitates gripping or positioning, and has a non-standard spherical contour formed by combining an integrated handle or a finger grip.

Furthermore, an overall shape of the massager may be a combination or derivative of the above basic shape. For instance, the main body is predominantly rod-shaped, but the massage head is designed to have a replaceable or fixed spherical or quasi-spherical structure. It is also essential to emphasize that the three shapes listed above do not exhaustively define an appearance of the massager, and any other overall shape that enables to effectively accommodate the internal inertial percussion mechanism and facilitates massage of the user falls within the inventive concept of the present disclosure.

Ultimately, a shape of the main body of the inertial percussion massager is appropriately selected to give full play to internal core percussion functions, which provides the user with a physical carrier that aligns with using habits and is operated in a safe, comfortable and easy manner.

Figure 22:
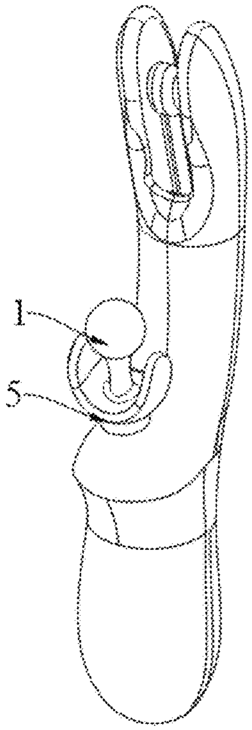
FIG. 22 is a perspective view of yet another embodiment of an inertial percussion massager provided by the present disclosure.

With reference to FIG. 22, in a specific embodiment, the inertial percussion massager is provided with a secondary massage arm 5. A core function of the secondary massage arm 5 is to massage an in-vitro target massage area through the percussion body 1 carried thereon. The term "in-vitro" emphasizes that the massager acts on a body surface of the user and is not an invasive massage device.

The support assembly 3 is alternatively connected to the secondary massage arm 5.

In summary, a specific shape of the inertial percussion massager may be as follows:

With reference to FIGS. 8, 9, 13, 14, 17 and 18, one first support arm 301 is provided.

With reference to FIGS. 10, 11, 12, 15, and 16, one first support arm 301 and one second support arm 302 are provided, the first support arm 301 and the second support arm 302 are arranged opposite to each other, and the percussion body 1 is located between the two support arms.

The first support arm 301 and the second support arm 302 may form the third opening 404, or end portions of the first support arm 301 and the second support arm 302 are integrally formed to enclose an integral whole structure.

Figure 19:
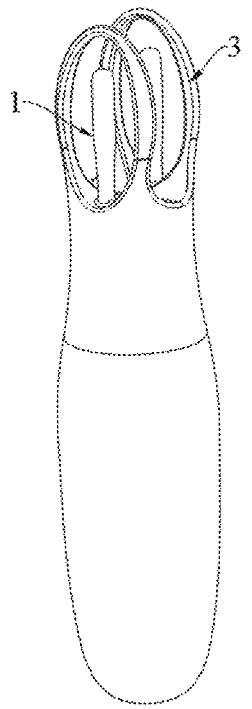
FIG. 19 is a perspective view of yet another embodiment of an inertial percussion massager provided by the present disclosure.
Figure 20:
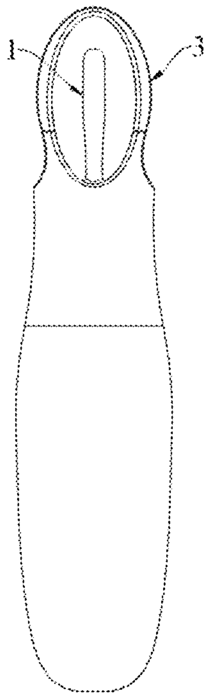
FIG. 20 is a front view of a structure shown in FIG. 19.
Figure 21:
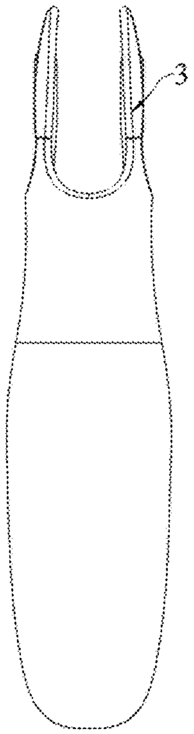
FIG. 21 is a perspective view of yet another embodiment of an inertial percussion massager provided by the present disclosure.

With reference to FIGS. 19-21, two sets of support arms are provided, and each set of support arms includes one first support arm 301 and one second support arm 302. Two percussion bodies 1 are connected to either set of support arms. Preferably, the two percussion bodies 1 perform the swinging motion in a same direction.

In the description of the embodiments of the present disclosure, it is to be understood that the terms "upper", "lower", "front", "back", "left", "right", "vertical", "horizontal", "central", "top", "bottom", "top surface", "bottom", "inner", "outer", "inside", "outside" and other indicated orientations or positional relationships are based on orientation or position relations shown in the accompanying drawings.

In the description of the embodiments of the present disclosure, it is to be noted that, unless otherwise explicitly specified and defined, the terms "mounting", "connected", "connecting" and "assembly" are to be understood in a broad sense, for example, they may be a fixed connection, a detachable connection, or an integrated connection; and may be a direct connection, or an indirect connection via an intermediate medium, or communication inside two elements. For those of ordinarily skilled in the art, specific meanings of the above terms in the present disclosure could be understood according to specific circumstances.

In the description of the embodiments of the present disclosure, specific feature, structure, material or characteristics described may be combined in a suitable manner in any one or more embodiments or examples.

In the description of the examples of the present disclosure, it is to be understood that "-" and "~" represent the range of two values, and the range includes endpoints. For example, "A-B" means a range greater than or equaling to A and less than or equaling to B. "A~B" means a range greater than or equaling to A and less than or equaling to B.

In the description of the embodiments of the present disclosure, the term "and/or" represents merely an association relationship describing associated objects, indicating that there may be three types of relationships, for example, A and/or B, which means three types of situations, that is, the existence of A alone, the existence of both A and B, and the existence of B alone. In addition, the character "/" herein generally indicates that the associated objects are in an "or" relationship.

Although the examples of the present disclosure have been illustrated and described, it is to be understood that those of ordinary skill in the art may make various changes, modifications, replacements and variations to the above examples without departing from the principle and spirit of the present disclosure, and the scope of the present disclosure is limited by the appended claims and their legal equivalents.

What is claimed is:

1. An inertial percussion massager, comprising:

a percussion body provided with a free end and a drive end;

a drive assembly;

a drive strategy assembly;

a percussive massage portion arranged at the free end and configured to act on a target massage area in an impact manner to produce a percussive massage effect;

the drive end is connected to the drive assembly;

the drive strategy assembly is configured to control a motion strategy of the drive assembly and drive the free end of the percussion body to move at a frequency f;

the frequency f is not less than 10 Hz and a support assembly; the support assembly partially encloses the percussion body to form an adaptively matched chamber based on a motion trajectory M of the percussion body; and the chamber comprises: a first opening; and wherein an opening face of the first opening intersects with the motion trajectory M of the percussion body; a second opening, being arranged opposite to the first opening; and an opening face of the second opening intersects with the motion trajectory M of the percussion body.

2. The inertial percussion massager according to claim 1, wherein the percussive massage portion is of a block structure or a layered structure; and an average density ρ2 of the percussive massage portion is greater than an average density ρ0 of the percussion body.

3. The inertial percussion massager according to claim 1, wherein an orientation of an opening face of the first opening is consistent with the motion trajectory M of the percussion body.

4. The inertial percussion massager according to claim 1, wherein a general orientation P2 of the opening face of the second opening is consistent with the motion trajectory M of the percussion body.

5. The inertial percussion massager according to claim 1, comprising:

an energy-storing elastic portion;

the energy-storing elastic portion is arranged at any position of a transmission path from the free end of the percussion body to the drive assembly; and when the free end of the percussion body is obstructed by the opening face, elastic potential energy is accumulated during elastic deformation.

6. The inertial percussion massager according to claim 1, wherein a length L of the percussion body is not less than 2 cm; and the length L is a maximum external dimension of the percussion body.

7. The inertial percussion massager according to claim 1, wherein the frequency f is 30-80 Hz.

8. The inertial percussion massager according to claim 1, wherein the frequency f is 40-60 Hz.

9. The inertial percussion massager according to claim 6, wherein a length L of the percussion body is 3-8 cm.

10. The inertial percussion massager according to claim 1, wherein an average density ρ1 of the free end of the percussion body is greater than an average density ρ0 of the percussion body.

11. The inertial percussion massager according to claim 1, wherein the support assembly comprises:

a first support arm, being located around a circumferential side of the percussion body.

12. The inertial percussion massager according to claim 11, wherein the support assembly comprises:

a second support arm, being arranged opposite to the first support arm; and the percussion body is located between the first support arm and the second support arm.

13. The inertial percussion massager according to claim 12, wherein a shape of the first support arm comprises but is not limited to any one or a combination of more of a straight plate shape, an arc-shaped plate shape, a wavy plate shape, and a tapered cross-section plate shape; and a shape of the second support arm comprises but is not limited to any one or a combination of more of a straight plate shape, an arc-shaped plate shape, a wavy plate shape, and a tapered cross-section plate shape.

14. The inertial percussion massager according to claim 1, wherein the support assembly comprises:

a third opening; and an orientation P3 of an opening face of the third opening is consistent with an axial direction of the inertial percussion massager.

15. The inertial percussion massager according to claim 1, wherein a shape of the chamber comprises but is not limited to any one or a combination of more of a circular shape, an elliptical shape, a rectangular shape, a water drop shape, a leaf shape, and a biomimetic profile formed by composite curves.

16. The inertial percussion massager according to claim 1, wherein a shape of the percussion body comprises but is not limited to any one or a combination of a spherical shape, a cylindrical shape, an ellipsoidal shape, a polygonal prism shape, a wavy shape, a flattened elliptical shape, and a dumbbell shape.

17. The inertial percussion massager according to claim 1, wherein a shape of the inertial percussion massager is any one or a combination of more of a rod shape, a spherical shape, and a quasi-spherical shape.

18. The inertial percussion massager according to claim 17, wherein the inertial percussion massager comprises:

a secondary massage arm;

the percussion body is connected to the secondary massage arm to massage an in-vitro target massage area; and the support assembly is connected to the secondary massage arm.

* * * * *